United States Patent

Akatani et al.

[11] Patent Number: 5,868,802
[45] Date of Patent: Feb. 9, 1999

[54] DISPERSE DYE COMPOSITION AND METHOD FOR DYEING HYDROPHOBIC FIBER MATERIALS WITH THE COMPOSITION

[75] Inventors: Yoshiki Akatani; Yasuo Shirasaki; Yasuo Murakami, all of Saitama, Japan

[73] Assignee: Nippon Kayaku Co., Ltd., Tokyo, Japan

[21] Appl. No.: 843,924

[22] Filed: Apr. 17, 1997

[30] Foreign Application Priority Data

Apr. 19, 1996 [JP] Japan ................................ 8-120791

[51] Int. Cl.$^6$ ............................. C09B 67/22; C09B 3/54
[52] U.S. Cl. ......................... 8/639; 8/696; 8/922
[58] Field of Search ...................... 8/639, 696, 922

[56] References Cited

U.S. PATENT DOCUMENTS 5,505,742  4/1996  Himeno et al. ........................... 8/639

FOREIGN PATENT DOCUMENTS

| 0 034 271 | 8/1981 | European Pat. Off. . |
| 0 060 433 | 9/1982 | European Pat. Off. . |
| 0 114 624 | 8/1984 | European Pat. Off. . |
| 0 621 318 | 10/1994 | European Pat. Off. . |
| 0 802 239 | 7/1997 | European Pat. Off. . |
| 36-16039 | 6/1961 | Japan . |
| 36-18534 | 9/1961 | Japan . |
| 45-12035 | 4/1970 | Japan . |
| 57-49583 | 2/1982 | Japan . |

*Primary Examiner*—Margaret Einsmann
*Attorney, Agent, or Firm*—Nields, Lemack & Dingman

[57] ABSTRACT

Disclosed is a disperse dye composition comprising dyes of Formulae (I) and (II).

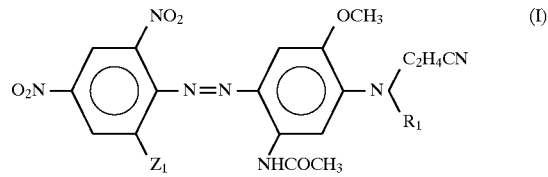

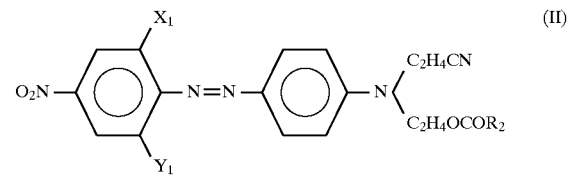

$Z_1$ is a halogen atom; $R_1$ is a $C_{1-4}$ alkyl group or a hydrogen atom; $X_1$ and $Y_1$ each are independently a chlorine atom or a bromine atom; $R_2$ is a $C_{1-4}$ alkyl group or a phenyl group. Using the composition, composite hydrophobic fiber materials can be dyed evenly, and the dyed materials have excellent color fastness.

4 Claims, No Drawings

DISPERSE DYE COMPOSITION AND METHOD FOR DYEING HYDROPHOBIC FIBER MATERIALS WITH THE COMPOSITION

FIELD OF THE INVENTION

The present invention relates to a dye composition and a dyeing method using it. More precisely, the invention relates to a disperse dye composition comprising specific dyes and to a method for dyeing hydrophobic fiber materials with the composition.

BACKGROUND OF THE INVENTION

Differential goods generically referred to as new synthetic fiber materials, which retain good characteristics of general synthetic fibers, are composed of raw yarns of different types having their own peculiar characteristics, such as microfibers, modified cross-section yarns and yarns composed of differently shrinkable fibers, and are prepared through composite conjugation or mere combination of such raw yarns, Because of their particular quality and feel of, for example, silk-like materials, peach skin materials and rayon-like materials which natural fibers do not have, the marketability for said new synthetic fiber materials is greatly expanding.

However, the dyeing of these composite materials as comprising microfibers, often involves various problems such as those mentioned below.

(1) The amount of light reflecting on the surfaces of the fibers increases, thereby lowering the visual depth of shade of the dyed materials.

(2) The dyed materials become poor light fastness, as being easily oxidized or reduced in light.

(3) Because of (1), the amount of dye used per unit area of the material shall increase, thereby lowering the sublimation and wet fastness of the dyed materials.

(4) The materials are dyed unevenly, as comprising composite fibers having different thicknesses.

In order to solve these problems, not only dyes having excellent buildup property and high fastness must be used but also dyes capable of level dyeing or good solid shade dyeing materials, which are composed of yarns having different thicknesses must be used.

If such composite materials are desired to be dyed in navy blue or black, it is said that the amount of the dye to be used must be from 2 to 5 times that of the dye for ordinary color. However, at present, no dye that is satisfactory for that purpose is commercially available to develop dyes that may be satisfactorily used for that purpose.

SUMMARY OF THE INVENTION

We, the present inventors have assiduously studied in order to solve the above-mentioned problems and, as a result, have found that the problems may be solved if the composite materials are dyed with a disperse dye composition comprising disperse dyes having specific structures, On the basis of this finding, we have completed the present invention.

Specifically, the present invention herein provides the following:

(1) A disperse dye composition comprising one or more dyes of a formula (I):

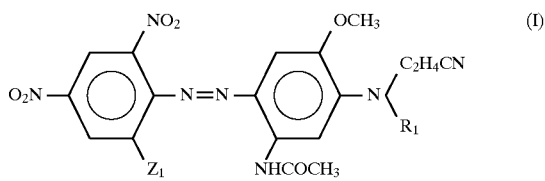

wherein $Z_1$ represents a halogen atom; and $R_1$ represents a $C_{1-4}$ alkyl group or a hydrogen atom; and one or more dyes of a formula (II):

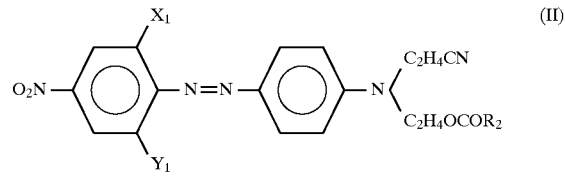

wherein $X_1$ and $Y_1$ each independently represent a chlorine atom or a bromine atom; and $R_2$ represents a $C_{1-4}$ alkyl group or a phenyl group.

(2) The disperse dye composition of the above-mentioned (1), in which $Z_1$ in formula (I) is a bromine atom, $R_1$ in formula (I) is a $C_{1-3}$ alkyl group or a hydrogen atom, $X_1$ and $Y_1$ in formula (II) are chlorine atoms, and $R_2$ in formula (II) is a methyl group.

(3) The disperse dye composition of the above-mentioned (1), which comprises a mixture of a dye of formula (I) where $R_1$ is an ethyl group and a dye of formula (I) where $R_1$ is a hydrogen atom.

(4) The disperse dye composition of the above-mentioned (1), which comprises dyes of the following formulae (III) to (V)

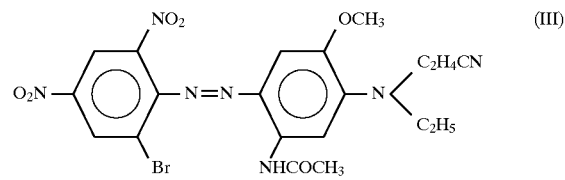

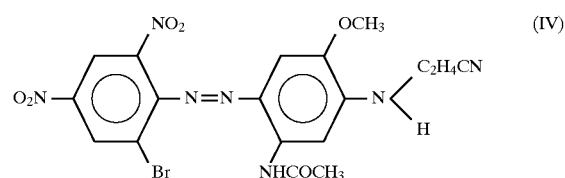

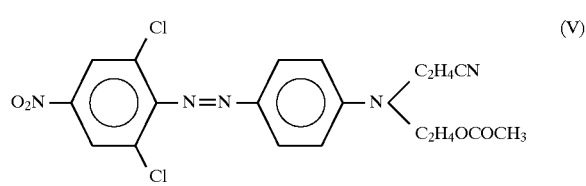

(5) The disperse dye composition of the above-mentioned (1), which comprises from 30 to 90% by weight of the dyes of formula (I) in total and from 10 to 70% by weight of the dyes of formula (II) in total.

(6) A method for dyeing fiber materials comprising hydrophobic fibers, preferably hydrophobic microfibers, with a disperse dye composition of any one of the above-mentioned (1) to (5).

MODES OF CARRYING OUT THE INVENTION

Now, the present invention is described in detail hereinunder.

As has been mentioned hereinabove, if one desires to dye fiber materials comprising microfibers into heavy shade dyed fiber materials, the amount of the dye to be used must be large whereby the fastness of the dyed fiber materials is lowered. In that case, therefore, the dye to be used is required to have higher buildup property and higher fastness than any other conventional dye. In particular, it is said that the amount of the dye to be used for dyeing the materials in black is about 5 times that of the dye for dyeing them in other ordinary color. In that situation, there are known few dyes capable of dyeing microfibers into dyed ones with satisfactory fastness. In particular, for dyeing composite fiber materials comprising fibers having different finenesses, even when the amount of the dye as fixed onto the extrafine yarns is the same as that of the dye as fixed onto the regular-sized yarns, the visual depth of shade of the dyed extrafine yarns is low for the reasons mentioned hereinabove, resulting in that the dyed composite fiber materials are seen to be unevenly dyed. Therefore, the dye to be used for dyeing the composite fiber materials must dye the extrafine yarns at high fastness and must dye the composite fiber materials evenly throughout in the same depth of shade.

Where composite materials comprising yarns having different finenesses are dyed with the disperse dye composition of the invention comprising navy blue disperse dyes of formula (I) and orange disperse dyes of formula (II), these can be dyed evenly and the dyed materials can have high fastness. Thus, where composite materials such as those mentioned hereinabove are dyed with the dye composition of the invention, the degree of the unevenness in the surfaces of the dyed materials is extremely low and the fastness of the dyed materials, including the light, sublimation and wet fastness thereof, is good.

Preferably, the dye composition of the present invention comprises from 30 to 90% by weight, more preferably from 40 to 70% by weight, of the disperse dyes of formula (I) relative to the total of the dyes of formulae (I) and (II), and from 10 to 70% by weight, more preferably from 30 to 60% by weight, of the disperse dyes of formula (II) relative to the total of the dyes of formulae (I) and (II). If desired, the composition may contain any other disperse dyes in addition to the dyes of formulae (I) and (II) The halogen substituent in formulae (I) and (II) may include a chlorine atom, a bromine atom, a fluorine atom and an iodine atom, but is preferably a chlorine atom or a bromine atom. The $C_{1-4}$ alkyl group therein may include a methyl group, an ethyl group, an n-propyl group and an i-propyl group, but is preferably a $C_{1-3}$ alkyl group, more preferably a $C_{1-2}$ alkyl group of an ethyl group or a methyl group.

Specific examples of the disperse dyes (navy blue dyes) of formula (I) for use in the present invention are as follows:

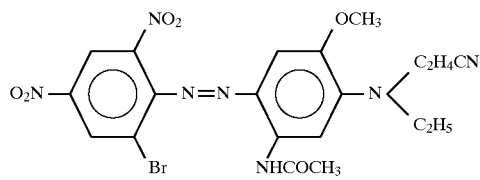

(III)

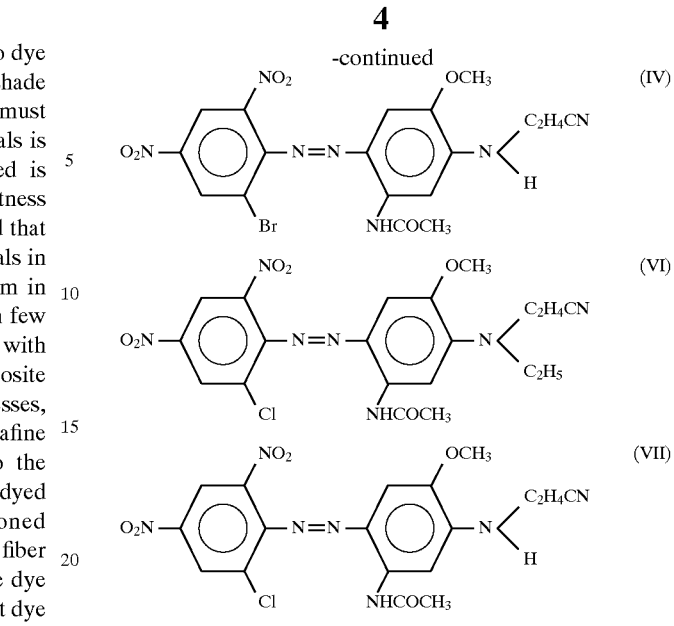

Mixtures of these may be used in the present invention.

Where a mixture comprised of the compound of formula (III) or (VI) and the compound of formula (IV) or (VII) is used, the proportion of the compound of formula (III) or (VI) is preferably from 60 to 95% by weight and that of the compound of formula (IV) or (VII) is from 5 to 40% by weight.

Specific examples of the disperse dyes (orange dyes) of formula (II) are as follows:

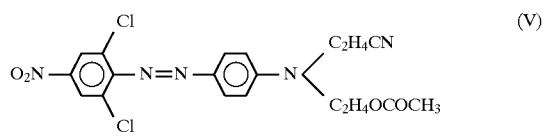

(V)

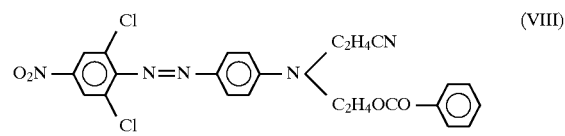

(VIII)

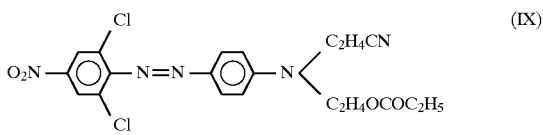

(IX)

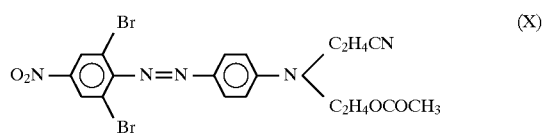

(X)

Mixtures of these may be used in the present invention.

In accordance with the intended color, optional dyes may be added to the composition of the invention comprising the dyes of formulae (I) and (II), Such optional dyes may be red to violet disperse dyes, and may be added to the composition of the invention in such a degree that they do not interfere with the quality of the composition.

The disperse dyes of formulae (I) and (II) constituting the disperse dye composition of the present invention are known, for example, in Japanese Patent Publication Nos. 45-12035, 36-16039 and 36-18534, or are similar to such known dyes. These can be easily prepared in accordance with the methods described in said patent publications or with methods similar to the disclosed methods.

To prepare the disperse dye composition of the present invention, powdery disperse dyes of formulae (I) and (II) may be directly mixed in the ratio mentioned hereinabove and thereafter ground and dispersed into a fine particulate composition. Alternatively, said powdery disperse dyes are first separately ground and dispersed into fine particulate dyes and thereafter mixed. In the latter case, the individual particulate dyes may be separately added to a dyeing bath in which the dye composition of the invention may be prepared in situ.

To separately ground and disperse the disperse dyes of formulae (I) and (II) or ground them together, in general, the dyes are put into a grinding machine, such as a ball mill or a sand mill, along with an anionic dispersant that may be selected from formalin condensates of naphthalenesulfonic acids and alkylbenzenesulfonic acids, formalin condensates of naphthalenesulfonic acids, formalin condensates of cresolsulfonic acids, formalin condensates of cresol and 2-naphthol-6-sulfonic acid, formalin condensates of alkyl-naphthalenesulfonic acids, formalin condensates of creosote oil sulfonates, lignin sulfonates and the like; or a nonionic dispersant that may be selected from ethylene oxide/propylene oxide block copolymers, alkylphenol-ethylene oxide adducts, polystyrenated phenol-ethylene oxide adducts and the like; or a mixture of such anionic dispersant and nonionic dispersant, in the presence of a small amount of water, and are fully wet-milled into dye particles generally having particle sizes of from 0.2 to $1\mu$ or so.

After having been thus wet-milled, the liquid or paste composition is directly used or, alternatively, it is dried, for example, through spray-drying into a powdery composition before use.

Now, the dyeing method of the present invention is described below,

Specific examples of the hydrophobic fibers capable of being dyed according to the method of the present invention include polyester (PET) fibers, triacetate fibers, diacetate fibers, polyamide fibers and mixed spun products of these fibers, and even other mixed spun products composed of these and regenerated fibers of, for example, rayon or composed of these and natural fibers of, for example, cotton, silk, wool or the like. The mean thickness of these hydrophobic fibers is preferably from 0.1 to 10 d (denier) or so.

To dye such hydrophobic fibers with the disperse dye composition of the invention comprising disperse dyes of formulae (I) and (II), according to the dyeing method of the invention, employable are any ordinary dyeing means of using, for example, exhaustion dyeing machines or the like. More advantageously, however, the fibers are dyed while being dipped in an aqueous medium comprising the composition under pressure at 105° C. or higher, preferably at from 110° C. to 140° C., for from 30 minutes to 1 hour. If desired, the dyeing may be conducted in the presence of a carrier, such as o-phenylphenol or trichlorobenzene, at relatively high temperatures, for example, in boiling water. A thermosol system is also employable in which cloth of hydrophobic fibers is dipped in a dispersion of the disperse dye composition of the invention, then passed through a padding mangle, and thereafter dry-heated under heat at from 150° to 230° C. for from 30 seconds to 1 minute.

Also if desired, the disperse dye composition of the present invention may be mixed with a natural paste (e.g., locust bean gum, guar gum, etc.), a processed paste (e.g., cellulose derivatives such as, carboxymethyl cellulose; processed locust bean gum, etc.), a synthetic paste (e.g., polyvinyl alcohol, polyvinyl acetate, etc.) or the like to prepare a printing paste, which is printed on cloth of hydrophobic fibers. The thus-printed cloth may be steamed or dry-heated. Apart from such a printing system, also employable is a different ink-jet printing system in which a wet agent, such as glycerin, diethylene glycol or the like, is added to the disperse dye composition of the invention to prepare ink, and the resulting ink is printed on cloth of hydrophobic fibers, to which was previously applied a paste or the like through padding, using an ink-jetting printer. In this, the thus-printed cloth is finally steamed or dry-heated.

The amount of the disperse dye composition of the invention to be used for dyeing hydrophobic fibers according to the dyeing method of the invention is not specifically defined. In preferred embodiments, however, where fibers of 3 deniers (3 d) are dyed, the amount may be from 5 to 15% o.w.f. (relative to the weight of the fibers to be dyed); and where fibers of 0.3 deniers (0.3 d) are dyed, it may be from 14 to 45% o.w.f. Now, the effects of the present invention are described in detail hereinunder, with reference to the following Test Examples.

The disperse dye compositions as obtained in Examples 1 to 6 (see Table 3) and Comparative Examples 1 to 6 (see Table 4) to be mentioned hereinunder were tested for their dyeability in the same color throughout dyed materials, their light, sublimation and water fastness, in accordance with the test methods of the following Test Examples 1 to 4. The results obtained are shown in Tables 1 and 2.

TEST EXAMPLE 1

Using any of the disperse dye compositions as obtained in Examples 1, 2, 3, 4, 5 and 6 in an amount of 20% o.w.f. (relative to the weight of the fibers to be dyed), 2.5 g of a woven fabric sample of processed polyester yarns of 3.0 deniers and 2.5 g of a woven fabric sample of processed, extrafine polyester yarns of 0.3 deniers were dyed in an exhaustion dyeing system having a bath ratio of 30:1 and a pH of 4.5, at 130° C. for 60 minutes. The dye compositions of the Comparative Examples were prepared to have almost the same optical density as the optical density of the composition of Example 1. Using these comparative dye compositions, the samples were dyed in the same manner as above.

The color of the thus-dyed 3.0 d samples and that of the thus-dyed 0.3 d samples were visually observed. The results are shown in Table 1 below, in which "O" (good) indicates that the samples were completely dyed all in the same color-shade; "Δ" (not good) indicates that the samples were dyed in somewhat different color-shade, and "X" (bad) indicates that the samples were dyed in quite different color-shade.

TABLE 1

Comparison of Solid Shade Effect in One-Bath dyeing of 3.0 d PET fabrics and 0.3 d PET Fabrics

|  | Visual Observation |
| --- | --- |
| Example 1 | o |
| Example 2 | o |
| Example 3 | o |
| Example 4 | o |
| Example 5 | o |
| Example 6 | o |

TABLE 1-continued

Comparison of Solid Shade Effect in One-Bath dyeing of 3.0 d PET fabrics and 0.3 d PET Fabrics

|  | Visual Observation |
|---|---|
| Comparative Ex. 1 | ○ |
| Comparative Ex. 2 | ○ |
| Comparative Ex. 3 | x |
| Comparative Ex. 4 | ○ |
| Comparative Ex. 5 | ○ |
| Comparative Ex. 6 | Δ |

TEST EXAMPLE 2

Using any of the disperse dye compositions as obtained in Examples 1 to 6 and in Comparative Examples 1 to 6 in an amount of 30% o.w.f. (relative to the weight of the fibers to be dyed), 5.0 g of a woven fabric sample of processed polyester yarns of 0.3 deniers was dyed in an exhaustion dyeing system having a bath ratio of 30:1 and a pH of 4.5, at 130° C. for 60 minutes. In accordance with the carbon arc lamp exposure test method of JIS L-0842, the dyed samples were exposed and faded, and the color of the exposed and faded samples was measured on the basis of the JIS blue scale standards. In the following Table 2, "O" indicates that the sample was better than those of the grade 3 (which are on the level for practical use), "Δ" indicates that the sample was of the grade 2 or 3; and "X" indicates that the sample was worse than those of the grade 2.

TEST EXAMPLE 3

The samples as dyed in the exhaustion dyeing system in Test Example 2 was measured to the sublimation fastness in accordance with JIS L-0879B (at 180° C. for 30 seconds), in which the degree of stains on white polyester cloth was measured on the basis of the JIS gray scale standards for stains. In the following Table 2, "O" indicates that the sample was better than those of the grade 3 (which are on the level for practical use), "Δ" indicates that the sample was of the grade 2 or 3; and "X" indicates that the sample was worse than those of the grade 2.

TEST EXAMPLE 4

The samples as dyed in the exhaustion dyeing system in Test Example 2 was heat-set at 180° C. for 30 minutes, and then subjected to the water-dipping test of JIS L-0846B, in which the samples were dipped in pure water (ion-exchanged water) containing 2 g/liter of a domestic synthetic detergent, New Beads (trade name of surfactant, produced by Kao Corp.). In this test, the degree of stains on white silk cloth was measured on the basis of the JIS gray scale standards for stains. In the following Table 2, "O" indicates that the sample was better than those of the grade 3 (which are on the level for practical use), "Δ" indicates that the sample was of the grade 2 or 3; and "X" indicates that the sample was worse than those of the grade 2.

TABLE 2

Color Fastness of Dyed Microfiber 0.3 d PET Fabrics

|  | Light Fastness | Sublimitation | Wet Fastness to Detergent-Containing Water |
|---|---|---|---|
| Example 1 | ○ | ○ | ○ |
| Example 2 | ○ | ○ | ○ |
| Example 3 | ○ | ○ | ○ |
| Example 4 | ○ | ○ | ○ |
| Example 5 | ○ | ○ | ○ |
| Example 6 | ○ | ○ | ○ |
| Comparative Example 1 | ○ | ○ | x |
| Comparative Example 2 | x | ○ | ○ |
| Comparative Example 3 | ○ | ○ | ○ |
| Comparative Example 4 | x | x | ○ |
| Comparative Example 5 | Δ | ○ | x |
| Comparative Example 6 | Δ | ○ | ○ |

As in Table 2, the 0.3-denier microfiber polyester fabric samples as dyed with any of the disperse dye compositions of the present invention all have good color fastness, or that is, their light, sublimation and wet fastness (to detergent-containing water) are all on the level for practical use. Thus, It is known that these dyed samples all have well-balanced color fastness. As opposed to these, the color fastness of the 0.3-denier microfiber polyester fabric samples as dyed with any of the comparative disperse dye compositions is not good, or that is, any of their light, sublimation and wet fastness is not good. The color fastness of the sample as dyed with the disperse dye composition of Comparative Example 3 was good, like that of the samples dyed with compositions of the present invention. However, as in Table 1, where 3.0-denier fabric and 0.3-denier fabric were dyed in the same dyeing bath comprising the composition of Comparative Example 3, the color shade of the 0.3-denier fabric was much more bluish than that of the 3.0-denier fabric. Thus, the ability of the composition of Comparative Example 3 to dye different hydrophobic fibers having different finenesses in the same color is poor. This is because the dyeing behavior of the blue disperse dye in that composition differs from that of the orange disperse dye in the same, when the composition comprising the both dyes is applied to different yarns having different thicknesses. Therefore, if the composition of that type is used to dye composite materials composed of fibers having different finenesses, the materials could not be dyed evenly, or that is, the color shade of the dyed materials is not even and the dyed materials will be color streaks.

As is obvious from the above, when the disperse dye composition of the present invention is used to dye hydrophobic fiber materials, even microfibers that could not be dyed satisfactorily by conventional disperse dyes can be dyed satisfactorily, or that is, the dyed fiber materials can have good color fastness including light, sublimation and wet fastness (to detergent-containing water) In addition, even composite fiber materials composed of fibers having different finenesses can be evenly dyed with the composition of the invention in the same color shade, and the thus-dyed composite fiber materials are on the level for practical use. Where the disperse dye composition of the present invention is used to dye composite, hydrophobic fiber materials comprising extrafine fibers which are referred to as microfibers, the materials thus dyed with the composition can have well-balanced color fastness including light, sublimation and wet fastness. In addition, even such composite materials comprising fibers having different finenesses can be evenly dyed with the composition of the invention throughout in the same color.

Now, the present invention will be described in more detail with reference to the following examples, which, however, are not intended to restrict the scope of the invention. In the following examples, "parts" and "%" are all by weight.

EXAMPLE 1

13 parts of a powdery disperse dye of formula (III) and 10 parts of a powdery disperse dye of formula (V) were ground and dispersed along with 20 parts of Demol N (trade name of anionic dispersant, produced by Kao Corp.) and 57 parts of pure water, in a sand grinder, to obtain a liquid, disperse dye composition of the invention.

Pure water as controlled to have a pH of 4.5 was added to 30 parts of the composition to prepare a dyeing bath of 3000 parts. 100 parts of a woven fabric sample of processed, polyester microfiber of 0.3 deniers were dipped in the bath and dyed therein at 130° C. for 60 minutes. The thus-dyed sample was reduction rinsed in a bath comprising 6 parts of 45% sodium hydroxide, 6 parts of hydrosulfite, 3 parts of Sunmor RC-700 (trade name of anionic surfactant, produced by Nikka Chemical Co.) and water to be 3000 parts in total, at 80° C. for 10 minutes, then washed with water and dried. Thus was obtained a black dyed sample. The thus-dyed sample had extremely good color fastness, or that is, all the light fastness, the sublimation and the wet fastness to water of the dyed sample were excellent.

EXAMPLE 2

10 parts of a powdery disperse dye of formula (III), 10 parts of a powdery disperse dye of formula (V) and 1.5 parts of a powdery dye, Kayalon Polyester Rubine BL-S 200 (red disperse dye, produced by Nippon Kayaku KK) were ground and dispersed along with 20 parts of Demor N and 58.5 parts of pure water, in a sand grinder, to obtain a liquid, disperse dye composition of the invention.

Pure water as controlled to have a pH of 4.5 was added to 30 parts of the composition to prepare a dyeing bath of 3000 parts. 100 parts of a woven fabric sample of processed, polyester microfiber of 0.3 deniers were dipped in the bath and dyed therein at 130° C. for 60 minutes. The thus-dyed sample was reduced and rinsed in a bath comprising 6 parts of 45% sodium hydroxide, 6 parts of hydrosulfite, 3 parts of Sunmor RC-700 and water to be 3000 parts in total, at 80° C. for 10 minutes, then washed with water and dried. Thus was obtained a black dyed sample. The thus-dyed sample had extremely good color fastness, or that is, all the light, sublimation and the wet fastness to water of the dyed sample were excellent.

EXAMPLE 3

7 parts of a powdery disperse dye of formula (III), 3 parts of a powdery disperse dye of formula (IV), 10 parts of a powdery disperse dye of formula (V) and 1.5 parts of a powdery dye, Kayalon Polyester Rubine BL-S 200 were ground and dispersed in the same manner as in Example 1 to obtain a liquid, disperse dye composition of the invention.

Using this in the same manner as in Example 1, a black dyed sample was obtained. The dyed sample had extremely good color fastness, like that in Example 1, or that is, all its light, sublimation and wet fastness to water were excellent.

EXAMPLE 4

10 parts of a powdery disperse dye of formula (III), 12 parts of a powdery disperse dye of formula (VIII) and 1.5 parts of a powdery dye, Kayalon Polyester Rubine BL-S 200 were ground and dispersed in the same manner as in Example 1 to obtain a liquid, disperse dye composition of the invention, Using this in the same manner as in Example 1, a black dyed sample was obtained. The dyed sample had extremely good color fastness, like that in Example 1, or that is, all its light, sublimation and wet fastness to water were excellent.

EXAMPLE 5

9 parts of a powdery disperse dye of formula (VI), 12 parts of a powdery disperse dye of formula (VIII) and 1.5 parts of a powdery dye, Kayalon Polyester Rubine BL-S 200 were ground and dispersed in the same manner as in Example 1 to obtain a liquid, disperse dye composition of the invention. Using this in the same manner as in Example 1, a black dyed sample was obtained. The dyed sample had extremely good color fastness, like that in Example 1, or that is, all its light, sublimation and wet fastness to water were excellent.

EXAMPLE 6

10 parts of a powdery disperse dye of formula (III), 12 parts of a powdery disperse dye of formula (IX) and 1.5 parts of a powdery dye, Kayalon Polyester Rubine BL-S 200 were ground and dispersed in the same manner as in Example 1 to obtain a liquid, disperse dye composition of the invention.

Using this in the same manner as in Example 1, a black dyed sample was obtained. The dyed sample had extremely good color fastness, like that in Example 1, or that is, all its light, sublimation and wet fastness to water were excellent.

EXAMPLE 7

390 parts of water was added to 10 parts of the liquid disperse dye composition as obtained in Example 2, and kneaded with 600 parts of a thickener comprising 7.5% of Fine Gum MC-8 (trade name of carboxymethyl cellulose derivative, produced by Dai-ichi Industrial Pharmaceutical Co.), 4.5% of Sorbitose C5 (trade name of ether-type processed starch, produced by W. A. Schorteln Co,) and 0.3% of citric acid. The resulting printing paste was printed on a polyester palace fabric, and then steamed at a high temperature of 175° C. for 7 minutes. The thus-dyed fabric was washed with water and then with hot water, thereafter reduced and rinsed in a bath comprising 2 parts of soda ash, 2 parts of hydrosulfite, 1 part of Meisanol BHS New (trade name of nonionic surfactant, produced by Meisei Chemical Industry Co.) and water to make 1000 parts in total, at 80° C. for 10 minutes, then further washed with water, and dried. Thus was obtained a black dyed fabric sample. In the thus-dyed sample, the non-dyed area (white background area) was stained only a little. In addition, the dyed sample had extremely good color fastness, or that is, all its light, sublimation and wet fastness to water were excellent.

The disperse dye compositions of Examples 1 to 6 are shown in Table 3 below where the dyes used are represented by formulae (XI) and (XII) mentioned below. In Table 3, the amounts of the powdery dyes, the toning dye, the dispersant and the pure water used are all parts by weight.

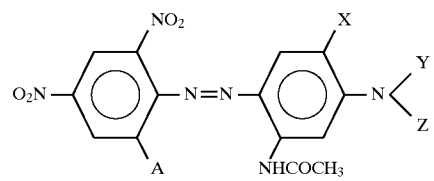

-continued

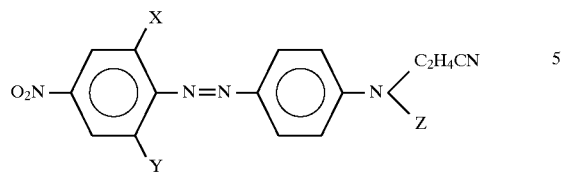

TABLE 3

| Example No. | (i) | A | X | Y | Z | (3) | (4) | (5) | (6) |
|---|---|---|---|---|---|---|---|---|---|
| 1 | 11 | −Br | −OCH$_3$ | −C$_2$H$_4$CH | −C$_2$H$_5$ | 13.0 | — | 20 | 57.0 |
|   | 12 | — | −Cl | −Cl | −C$_2$H$_4$OCOCH$_3$ | 10.0 |   |   |   |
| 2 | 11 | −Br | −OCH$_3$ | −C$_2$H$_4$CN | −C$_2$H$_5$ | 10.0 | 1.5 | 20 | 58.5 |
|   | 12 | — | −Cl | −Cl | −C$_2$H$_4$OCOCH$_3$ | 10.0 |   |   |   |
| 3 | 11 | −Br | −OCH$_3$ | −C$_2$H$_4$CN | −C$_2$H$_5$ | 7.0 | 1.5 | 20 | 58.5 |
|   | 11 | −Br | −OCH$_3$ | −C$_2$H$_4$CN | −H | 3.0 |   |   |   |
|   | 12 | — | −Cl | −Cl | −C$_2$H$_4$OCOCH$_3$ | 10.0 |   |   |   |
| 4 | 11 | −Br | −OCH$_3$ | −C$_2$H$_4$CN | −C$_2$H$_5$ | 10.0 | 1.5 | 20 | 56.5 |
|   | 12 | — | −Cl | −Cl | −C$_2$H$_4$OCO−C$_6$H$_5$ | 12.0 |   |   |   |
| 5 | 11 | −Cl | −OCH$_3$ | −C$_2$H$_4$CN | −C$_2$H$_5$ | 9.0 | 1.5 | 20 | 57.5 |
|   | 12 | — | −Cl | −Cl | −C$_2$H$_4$OCO−C$_6$H$_5$ | 12.0 |   |   |   |
| 6 | 11 | −Br | −OCH$_3$ | −C$_2$H$_4$CN | −C$_2$H$_5$ | 10.0 | 1.5 | 20 | 56.5 |
|   | 12 | — | −Cl | −Cl | −C$_2$H$_4$OCOC$_2$H$_5$ | 12.0 |   |   |   |

(1) Formulae
(2) A, X, Y and Z in Formulae (XI) and (XII)
(3) Amounts of Dyes Used
(4) Amount of Toning Dye Used (see Note 7 below)
(5) Dispersant
(6) Pure Water
Note 7: This is powder of Kayalon Polyester Rubine BL-S 200.

COMPARATIVE EXAMPLES 1 TO 6

In place of the navy blue disperse dye of formula (I) and the orange disperse dye of formula (II), disperse dyes of the following formulae (XI) and (XII) were used herein, and comparative, liquid disperse dye compositions were prepared in the same manner as in the above-mentioned Examples. Precisely, the disperse dyes used herein are those of formulae (XI) and (XII) where the substituents A, X, Y and Z are as in Table 4, and these disperse dyes of the amounts indicated in Table 4 were mixed. In Table 4, the amounts of the powdery dyes, the toning dye, the dispersant and the pure water used are all parts by weight. The results of the samples as dyed with the comparative compositions are as in the above-mentioned Tables 1 and 2.

TABLE 4

| Comparative Example No. | (i) | A | X | Y | Z | (3) | (4) | (5) | (6) |
|---|---|---|---|---|---|---|---|---|---|
| 1 | 11 | −Br | −OCH$_3$ | −C$_2$H$_4$CN | −C$_2$H$_5$ | 10.0 | 1.5 | 20 | 57.7 |
|   | 12 | — | −Cl | −Cl | −C$_2$H$_4$CN | 10.8 |   |   |   |
| 2 | 11 | −Br | −OCH$_3$ | −C$_2$H$_4$CN | −C$_2$H$_5$ | 10.0 | 1.0 | 20 | 60.1 |

TABLE 4-continued

| Comparative Example No. | (i) | A | X | Y | Z | (3) | (4) | (5) | (6) |
|---|---|---|---|---|---|---|---|---|---|
| | 12 | — | -H | -H | -C$_2$H$_4$OCO-C$_6$H$_5$ | 8.9 | | | |
| 3 | 11 | -Br | -OCH$_3$ | -C$_2$H$_4$CN | -C$_2$H$_5$ | 10.0 | 0.5 | 20 | 62.5 |
| | 12 | — | -Cl | -H | -C$_2$H$_4$CN | 7.0 | | | |
| 4 | 11 | -Br | -OCH$_3$ | -C$_2$H$_5$ | -C$_2$H$_5$ | 4.7 | 1.5 | 20 | 59.1 |
| | 11 | -Br | -H | -C$_2$H$_5$ | -C$_2$H$_5$ | 4.7 | | | |
| | 12 | — | -Cl | -Cl | -C$_2$H$_4$OCOCH$_3$ | 10.0 | | | |
| 5 | 11 | -Br | -OCH$_3$ | -C$_2$H$_4$OCOCH$_3$ | -C$_2$H$_4$OCOCH$_2$ | 12.3 | 1.5 | 20 | 56.2 |
| | 12 | — | -Cl | -Cl | -C$_2$H$_4$OCOCH$_3$ | 10.0 | | | |
| 6 | 11 | -Br | -OCH$_3$ | -C$_2$H$_4$CN | -CH$_2$-C$_6$H$_5$ | 12.7 | 1.5 | 20 | 55.8 |
| | 12 | — | -Cl | -Cl | -C$_2$H$_4$OCOCH$_3$ | 10.0 | | | |

(1) Formulae
(2) A, X, Y and Z in Formulae (XI) and (XII)
(3) Amounts of Dyes Used
(4) Amount of Toning Dye Used (see Note 7 below)
(5) Dispersant
(6) Pure Water While the invention has been described in detail and with reference to specific embodiments thereof, it will be apparent to one skilled in the art that various changes and modifications can be made therein without departing from the spirit and scope thereof.

What is claimed is:

1. A disperse dye composition consisting essentially of 30 to 90% of one or more dyes of a formula (I):

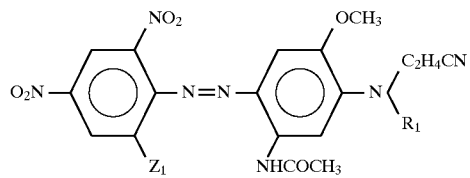

wherein Z$_1$ represents a halogen atom; and R$_1$ represents a C$_{1-4}$ alkyl group or a hydrogen atom;

and 10 to 20% of one or more dyes of a formula (II):

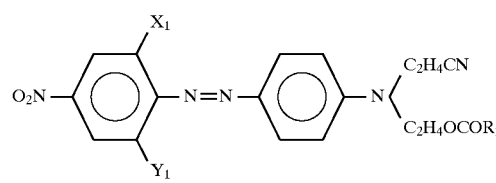

wherein X$_1$ and Y$_1$ each independently represent a chlorine atom or a bromine atom; and R$_2$ represents a C$_{1-4}$ alkyl group or a phenyl group.

2. The disperse dye composition as claimed in claim 1, in which Z$_1$ in formula (I) is a bromine atom, R$_1$ in formula (I) is a C$_{1-3}$ alkyl group or a hydrogen atom, X$_1$ and Y$_1$ in formula (II) are chlorine atoms, and R$_2$ in formula (II) is a methyl group.

3. The disperse dye composition as claimed in claim 1, in which the dyes of formula (I) consists essentially of a mixture of a dye of formula (I) where R$_1$ is an ethyl group and a dye of formula (I) where R$_1$ is a hydrogen atom.

4. The disperse dye composition of as claimed in claim 1, which consists essentially of dyes of the following formulae (III) to (V):

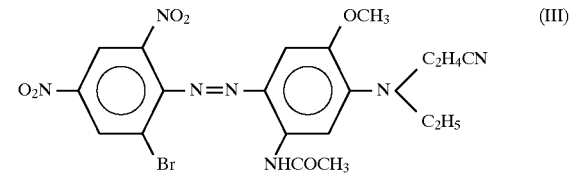

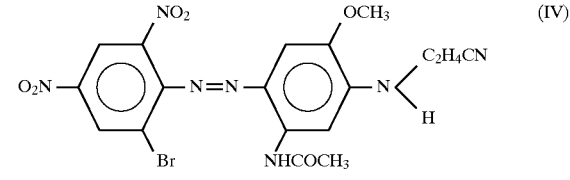

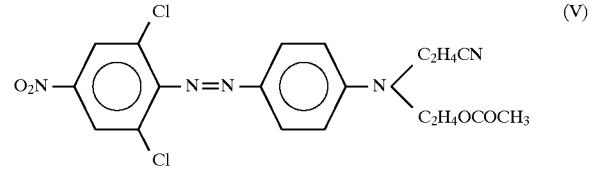

* * * * *